United States Patent [19]

Buchel

[11] 4,186,215

[45] Jan. 29, 1980

[54] BEVERAGE CARBONATION ARRANGEMENT

[75] Inventor: Johannes A. Buchel, Danbury, Conn.

[73] Assignee: PepsiCo. Inc., Purchase, N.Y.

[21] Appl. No.: 882,750

[22] Filed: Mar. 2, 1978

[51] Int. Cl.² ............................................. A23L 2/40
[52] U.S. Cl. .................................. 426/86; 99/323.1; 99/323.2; 206/217; 261/DIG. 7; 422/239; 422/305; 423/438; 426/67; 426/115; 426/477; 426/561; 426/591
[58] Field of Search ............ 426/85, 86, 77-79, 426/112, 115, 67, 477, 120, 591, 561; 23/282; 423/438; 99/323.1, 323.2; 206/0.5, 217, 218; 229/1.5 B; 261/DIG. 7; 422/237, 238, 239, 305

[56] References Cited

U.S. PATENT DOCUMENTS

| | | | |
|---|---|---|---|
| 6,333 | 0/1849 | Andrews | 426/477 |
| 867,964 | 10/1907 | Von Foregger | 23/282 |
| 869,610 | 10/1907 | Zucker | 206/0.5 |
| 1,315,268 | 9/1919 | Wise | 23/282 |
| 1,592,395 | 7/1926 | Sulzberger | 426/86 |
| 1,889,111 | 11/1932 | Serr | 426/86 |
| 2,102,920 | 12/1937 | Savage | 426/85 |
| 2,334,211 | 11/1943 | Miller | 23/282 |
| 2,742,363 | 4/1956 | Hughes | 426/86 X |
| 2,967,776 | 1/1961 | Utley | 426/86 X |
| 2,968,560 | 1/1961 | Goros | 426/115 X |
| 3,186,850 | 6/1965 | Anthony | 426/86 |
| 3,246,959 | 4/1966 | Brewer | 23/282 |
| 3,476,520 | 11/1969 | Hovey | 261/122 X |
| 3,480,403 | 11/1969 | Hovey | 23/282 |
| 3,888,998 | 6/1975 | Sampson et al. | 261/DIG. 7 |

*Primary Examiner*—Steven L. Weinstein
*Attorney, Agent, or Firm*—Scully, Scott, Murphy & Presser

[57] ABSTRACT

An arrangement for carbonating a beverage over an extended period of time through the addition of water or beverage liquid base to a powdered or dry carbonate and acid located in a pressure chamber. A permeable surface of the chamber allows a small quantity of water to enter and initiate a chemical reaction generating gaseous carbon dioxide. The carbon dioxide will exit the chamber and carbonate the beverage. A resultant pressure drop in the chamber will permit the entry of more water to generate more carbon dioxide until the pressure is balanced, with the sequence being repetitive. A flavoring chamber containing flavor powder may be superimposed on the pressure chamber to effect admixing of the flavoring and liquid concurrent with carbonation. The pressure chamber, and flavoring chamber, may be formed integrally with a container, or may consist of a separate unit adapted to be placed in a container to which water or liquid base is then added.

6 Claims, 6 Drawing Figures

BEVERAGE CARBONATION ARRANGEMENT

BACKGROUND OF THE INVENTION

1. Field of the Invention

The present invention relates, in general, to an arrangement and a process for carbonating a beverage through a chemical carbonating reaction and, more particularly, to an arrangement and process in which carbon dioxide is released into a beverage over an extended time interval in order to impart carbonation thereto, and wherein the products of the chemical carbonation reaction remain essentially segregated from the beverage.

2. Discussion of the Prior Art

The art or concept of carbonating a beverage by the addition of water or suitable liquids to dry chemicals is well developed in the technology. Some of the early publications in this field recommend admixing an acid, such as tartaric acid, with a carbonate, such as baking soda, and a flavoring so as to produce a carbonated beverage when the mix is dissolved in water. A carbonation system of this nature is generally economical to produce, and there is available a wide choice of safe carbonates and acids which are constituted of commonly used food ingredients. Moreover, many carbonates and acids have properties which are compatible with those of other commonly used ingredients in dry beverage mixes.

Unfortunately, a carbonation system of this type is subject to several disadvantages and drawbacks. Thus, the rate of carbonation of the beverage is often unsatisfactory, such as when the powder is admixed with water, to thereby result in an initial excessive liberation of carbon dioxide, producing attendant foaming of the beverage, followed by a period of diminishing gas generation in which the carbonation of the beverage is at an inadequate level. Further, the taste of the resultant beverage is often adversely affected by the products which are formed during the chemical carbonation reaction so as to produce a salty, acidic tasting beverage. Also, the visual appearance of the beverage is frequently adversely affected by being rendered murky through the presence of undissolved salts which are formed during the reaction. Furthermore, the shelf life of the dry mix often is of an insufficient duration so as to render the dry mix unsuitable for numerous commercial applications.

Many approaches have been suggested by the prior art which are designed to overcome the aforementioned deficiencies. For instance, it has been suggested that the carbonation rate may be controlled by the application of coating agents, such as gums, to the dry powders, or by applying special granulation techniques to the powders. As a result of these technical contributions, there is now commercially available encapsulated sodium bicarbonate which is capable of releasing carbonation into a cold drink over a period of time ranging from several seconds up to a few hours. Additionally, the taste and appearance of dry mix beverages have been improved by the introduction of numerous new acidic and carbonate compounds. Further, the shelf life of the dry mixture has been extended by applying agglomeration and other blending techniques to the mixture and by protecting the carbonating compounds with chemical agents.

The prior art suggests several approaches to carbonation which, superficially, appear to be similar to those proposed by the present invention. However, each of these prior art approaches differs from the present invention in one or another material aspect.

Savage U.S. Pat. No. 2,102,920 for "Drink Preparing Means" discloses an arrangement for preparing a carbonated beverage in which a perforated paper envelope containing a carbonating mixture constituted of an acid and an alkali is disposed within a drinking straw. A water-soluble coating of a flavoring is applied to the inside of the straw and, when water is drawn through the latter, carbon dioxide is generated by the carbonating mixture and flavoring is added by means of the water-soluble coating. The straw disclosed in this patent is quite distinct from the arrangement suggested by the present invention wherein a separate pressure chamber is utilized to generate the carbonating gas, thereby resulting in several attendant advantages.

Mitchell et al U.S. Pat. No. 3,467,526 for "Process for Producing a Supersaturated Solution of Carbon Dioxide" discloses a packaging arrangement wherein a first compartment contains a liquid having dissolved therein a carbonate, and wherein a second compartment contains an acidic liquid. One corner of the packaging arrangement may be ripped off to cause admixing of the two liquids, thereby resulting in the generation of carbon dioxide for the purpose of carbonation of the beverage.

Ehrreich III, et al U.S. Pat. No. 3,556,803 for "Method of Making a Carbonated Composition" is of interest in disclosing a carbonating mixture including a water-soluble polymeric acid and a carbonate. When water is added, the components react to form carbon dioxide and a water-insoluble polymeric salt which does not adversely affect the flavoring or taste of the resultant beverage.

Spooner U.S. Pat. No. 4,009,285 for "Method for Producing Champagne" discloses a system for the secondary fermentation of champagne wine within a bottle wherein a cap having a porous polyvinyl chloride membrane separates yeast cells from the wine. Through the intermediary of this arrangement, the yeast is physically separated from the main body of the wine while being permitted to contact some of the liquid, and in which the resultant carbon dioxide exits from the chamber by passing through the permeable membrane. Although the disclosure of Spooner appears superficially to be similar to that of the present invention, several noteworthy distinctions are in evidence. In essence, Spooner relies upon a natural fermentation process in order to generate carbon dioxide over a lengthy period of time rather than a relatively rapid chemical reaction involving a carbonate and an acid. Moreover, apparently there would not be a substantial pressure differential present between the compartment and the bottle which will, in a controlled manner, allow liquid to enter into the chamber containing the yeast. In fact, the yeast must be dissolved in the wine for fermentation to occur and, accordingly, wine must fill the yeast chamber. This is quite different from the arrangement and process of the present invention in which an excess amount of liquid is prevented from entering the pressure chamber so as to avoid an excessive generation of carbon dioxide. Furthermore, since the pressure chamber is not filled with liquid, the salts resulting from the chemical reaction are not dissolved therein and, as a consequence, do not adversely affect the taste of the resultant beverage.

Whyte et al U.S. Pat. No. 4,025,655 for "Beverage Carbonation Devices" discloses a beverage carbonation arrangement in which molecular sieves containing carbon dioxide and a beverage flavoring are mixed together in a closed bag. The bag is positioned within a container and water is poured into the container while being passed through the bag. Contact of the water with the molecular sieves releases the carbon dioxide contained therein while simultaneously dissolving the flavoring for the beverage. The Whyte et al device differs from that of the present invention in its manner of releasing, as opposed to generating, carbon dioxide, and in the manner in which both the carbon dioxide source and the beverage powder are located within the same storage bag.

SUMMARY OF THE INVENTION

In order to obviate and ameliorate the shortcomings and limitations encountered in the prior art, the present invention contemplates the provision of an improved and unique arrangement and process for carbonating a beverage, particularly a beverage formed by the addition of water to a dry powder flavoring.

Pursuant to a preferred embodiment of the invention, a pressure chamber having at least one wall formed of a permeable material which allows the passage therethrough of both liquid entering and carbon dioxide leaving the chamber is adapted to be immersed in the liquid base of a beverage. A carbonating mixture, including a carbonate and an acid, is arranged in the pressure chamber so that, when the chamber is immersed in liquid, a small quantity of the liquid passes through the permeable wall so as to thereby activate the carbonating mixture. The resultant chemical reaction generates carbon dioxide and produces an increase in the gas pressure within the chamber thereby preventing further liquid from entering the chamber until a substantial quantity of carbon dioxide passes through the permeable wall into the adjoining beverage. The pressure in the chamber will eventually drop to a level which is sufficiently low to allow additional liquid to enter the chamber and provide for the generation of additional carbonating gas. The arrangement and process provides for the establishment of an equilibrium between the pressure of carbon dioxide present within the chamber and the quantity of liquid passing through the permeable wall, and thereby effects the generation of additional gas. An arrangement and process of this nature results in affording the generation of a carbonating gas for the beverage at a substantially constant and controlled rate over an extended period of time. Further, the invention has the additional advantage of preventing liquid from entering the chamber in quantities large enough to dissolve the products of the carbonation reaction, including undesirable salts. Since the products are not dissolved they are prevented from returning through the permeable wall into the beverage where they would adversely affect its taste and other physical properties.

In accordance with one embodiment of the invention, the arrangement and process includes a flavoring chamber containing a quantity of dry flavoring powder which is dissolved in the beverage through the addition of water. In this instance, the flavoring chamber is located above the pressure chamber so that carbon dioxide which is generated within the pressure chamber passes through the permeable wall into the flavoring chamber. Further, in accordance with a modified embodiment of the invention, the pressure chamber is formed as an integral part of the container and extends over substantially the entire bottom thereof. Additionally, pursuant to one aspect of the present invention, the permeable wall is formed by a permeable membrane having a pore size in the range of from 10 to 100 microns, and may be constructed from a suitable paper or other suitable material.

Accordingly, it is a primary object of the present invention to provide a novel arrangement and process for carbonating a beverage which releases carbonating gas into the beverage at a substantially constant rate over a prolonged period of time.

Another object of the present invention is to provide an arrangement and process of the type described in which the products of the carbonation reaction, including any undesirable salts, are not dissolved in the beverage so as to adversely affect its taste.

BRIEF DESCRIPTION OF THE DRAWINGS

The foregoing and other objects and advantages of the inventive beverage carbonation arrangement and process practiced pursuant to the teachings of the present invention may be more readily understood by one skilled in the art, having reference to the following detailed description of several preferred embodiments thereof, taken in conjunction with the accompanying drawings in which identical reference numerals are used to refer to similar elements throughout; in which.

DETAILED DESCRIPTION OF THE DRAWINGS

Figure 2:
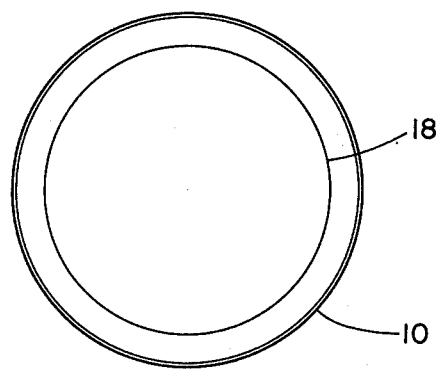
FIG. 2 is a top plan view of the arrangement of FIG. 1.
Figure 1:
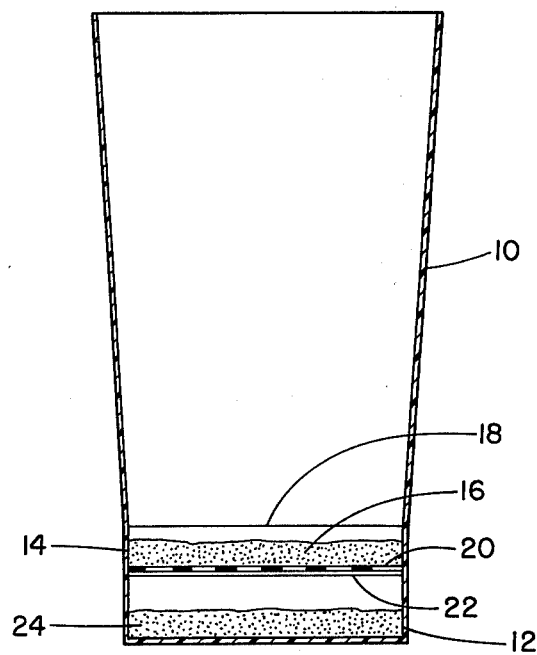
FIG. 1 is an elevational sectional view of a first embodiment of a beverage carbonation arrangement pursuant to the invention wherein the flavoring and pressure chambers are constructed as an integral part of a beverage container.

Referring now in detail to the drawings, FIG. 1 illustrates a sectional view of a beverage container 10 in the form of a drinking glass or cup having a pressure chamber or pressure generating compartment 12 arranged in the bottom part thereof, and a flavoring chamber or compartment 14 located directly above the pressure chamber 12 as an integral portion of the container 10. The container 10 may be formed of glass or plastic, or any suitable generally rigid material able to withstand some degree of internal pressure. The flavoring chamber contains a dry water-soluble powder 16, which may be constituted of any of the popular beverage flavorings, such as cola, lemonade, cherry, etc. As illustrated, the flavoring chamber 14 may be a downwardly reducing frustoconical member. If desired, the top of the flavoring compartment 14 may be sealed with a seal 18. If a seal is provided it may be constructed of a water-soluble material which dissolves upon the introduction of water or a liquid into the beverage container when contacted by the former, or alternatively, it may be a type of seal which can be peeled off from the top of the flavoring compartment or pierced with a utensil, such as a fork or knife. The base of the flavoring chamber 14 is formed by a support member 20, the function of which is to support the weight of the flavoring 16 within the container while allowing any water to pass therethrough to the top of the pressure chamber 12 located therebelow. The top of the pressure chamber 12 is formed by a permeable membrane 22 which is of suitable porosity and is also constructed from a type of material which may be safely used with food products. The permeable membrane 22 is selected so as to allow water to pass slowly therethrough into the pressure chamber 12 and to also permit carbon dioxide to pass from the chamber 12 to carbonate the beverage within the container. A carbonation mixture 24 is placed within the pressure chamber, preferably including a carbonate such as sodium bicarbonate and a suitable acid such as citric acid, with both components being in a powdered form so that no chemical interreaction takes place between them until water is added thereto. An air spaced is left above the mixture 24 below membrane 22 in order to allow room for the generation of the carbonation gas. In this embodiment, the bottom of the beverage container forms the base of the pressure chamber, while the annular side wall of the container forms the side wall of both the flavoring and pressure compartments. The permeable membrane 22 may be formed from paper, spun plastic, or any suitable material, and may have a pore size in the range of from 10 to 100 microns. In the embodiment of FIGS. 1 and 2, the beverage container and the segments thereof it commonly shares with the pressure and flavoring chambers 12, 14 may be preferably formed of a suitable molded plastic. In a modification of this embodiment, the support member 20 may be eliminated, with the permeable membrane 22 itself forming both the bottom of the flavoring compartment and the top of the pressure compartment.

The beverage carbonation arrangement illustrated in FIGS. 1 and 2 operates as follows:

When water is poured into the container or glass 10 it enters the flavoring chamber 14 through seal 18 and dissolves the flavoring powder 16 therein. The water then passes through the support member 20 at the bottom of the flavoring chamber 14 until it encounters the permeable membrane 22. A small quantity of water seeps or passes through the membrane 22, and drips onto the carbonating mixture 24 in the pressure chamber 12 to cause the components thereof to chemically react, resulting in the formation of gaseous carbon dioxide. The generated carbon dioxide causes an increase in the pressure to take place within the chamber 12, thereby slowing or inhibiting the entry of additional water through the membrane 22. While water is slowly entering, carbon dioxide is also passing upwardly through the permeable membrane 22, and bubbles up into the flavoring chamber 14 and generally through the beverage container 10. The carbon dioxide bubbles help in thoroughly admixing the flavoring throughout the beverage in the container. When sufficient carbon dioxide passes through the permeable membrane 22 so as to produce a pressure drop in the pressure chamber 12, additional liquid enters the chamber through the membrane and produces the generation of more gas upon contacting the carbonating mixture. In this manner, an equilibrium is soon established between the pressure of carbon dioxide within the chamber 12 and the quantity of liquid passing through the permeable member in causing the generation of controlled quantities of additional carbonating gas. During this period the interior of the pressure chamber 12 does not fill with liquid, and carbon dioxide is released from the chamber at a steady rate over an extended period of time.

Since only a relatively small quantity of liquid enters the pressure chamber 12, the products of the carbonation reaction, including any resultant salt (which, in the case of sodium bicarbonate and citric acid, would be sodium citrate) is not dissolved in liquid and thus prevented from being returned through the membrane 2 to thereby adversely affect the taste of the flavored and carbonated beverage.

Figure 4:
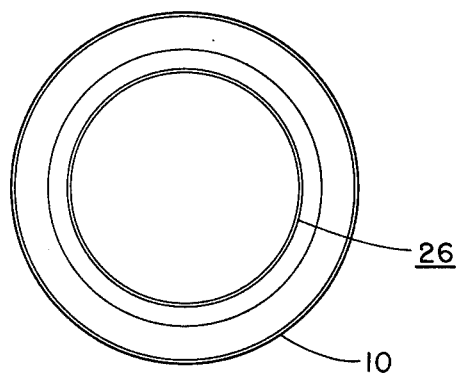
FIG. 4 is a top plan view of the arrangement of FIG. 3.
Figure 3:
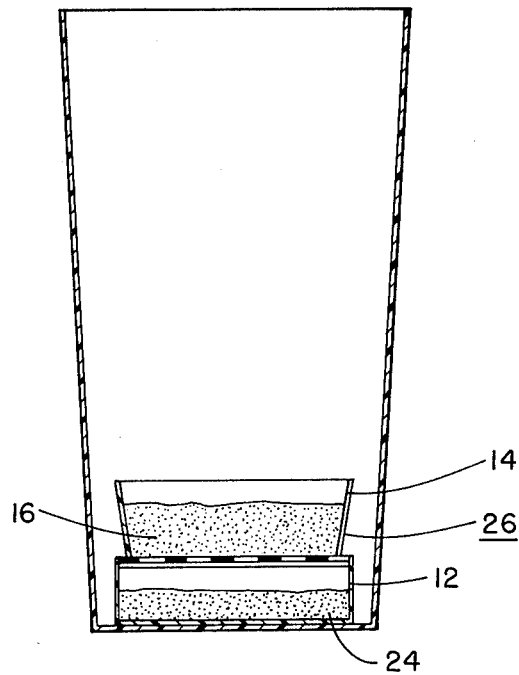
FIG. 3 is an elevational sectional view of a second embodiment of the invention where an upper compartment and a lower pressure chamber are constructed as a unit separate from the beverage container in which they are adapted to be positioned.

FIGS. 3 and 4 of the drawings illustrate a second embodiment of the invention wherein the pressure chamber 12 and upper compartment 14 are formed as an integral unit 26 which is constructed separate from the beverage container, and is placed in the latter prior to the addition of water. An advantage of this embodiment resides in that all of the ingredients required for a carbonated drink may be packaged in small units each of which may be placed in a drinking glass to which water is then subsequently added. In the embodiment shown in FIGS. 3 and 4, the pressure and upper chambers 12 and 14 may be separately molded from a suitable plastic material and then assembled with the permeable membrane 22 and seal 18 (if desired) for sealing the top of the chamber 14. In this construction, a tear-away type of seal 18 for the top of the chamber 14 containing a flavoring is particularly suitable.

Figure 5:
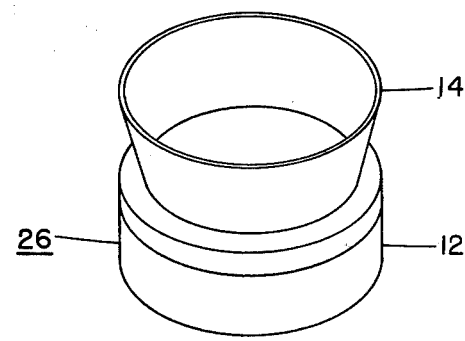
FIG. 5 is a perspective view of the upper compartment and pressure chamber unit shown in FIGS. 3 and 4.

FIG. 5 is a perspective view of the embodiment shown in FIGS. 3 and 4 but with the upper compartment or chamber 14 being basically open, in effect, without a seal and not containing any flavoring, which is one form in which a product of this nature may be sold. With a unit of this type, the purchaser may freely place any kind of flavoring he desires into the flavoring compartment prior to adding water. The unit may also be used without any flavoring by adding it to a ready beverage such as non-carbonated soft drinks, fruits juices, wines, etc. Also, in yet another modification, it is feasible to completely eliminate a flavoring chamber, in which case the pressure chamber would be placed in the bottom of a beverage container and, if desired, a suitable flavoring added either prior to or subsequent to the addition of water.

Figure 6:
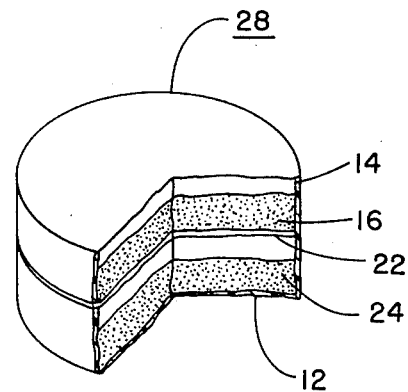
FIG. 6 is a partially sectioned perspective view of a modified flavoring and pressure chamber unit.

FIG. 6 of the drawings illustrates yet another embodiment of the invention wherein the pressure and flavor chambers 12 and 14, respectively containing the carbonation powder mixture and flavoring powder, are formed in one integral unit 28 of a substantially cylindrical or tablet-like shape. When positioning this unit in the container, care must be exercised that the flavoring chamber is oriented above the pressure chamber.

With the practice of the present invention, the different types of carbonates and acids which may be utilized in the pressure chamber are greatly increased over the selections currently available for use in many prior art carbonation arrangements. The chemical products of the reaction do not dissolve or commingle with the resultant carbonated beverage and, accordingly, many kinds of carbonates and acids may be utilized with the present invention which were previously considered unsuitable for use in prior art beverage carbonation arrangements.

While several different embodiments of the present invention have been disclosed in detail, the teachings of the present beverage carbonation arrangement as set forth herein will suggest many alternative embodiments to those skilled in the art. For instance, the dry components 16 and 24 may be provided in the form of powders, in a granulated form, or in a molded solid form.

What is claimed is:

1. An arrangment for carbonating a beverage at a substantially constant carbonation rate, comprising:
   (a) a pressure chamber immersible in the liquid base of the beverage for generating carbon dioxide;
   (b) a carbonating mixture including a carbonate and an acid located in said pressure chamber;
   (c) means for generating carbon dioxide at a substantially constant carbonation rate by establishing an equilibrium between the pressure of carbon dioxide within the chamber and the quantity of liquid entering the chamber to produce the generation of additional carbon dioxide, including the top surface of said pressure chamber being formed of a permeable membrane facilitating passage therethrough of liquid entering the chamber in inverse relation to the pressure of gaseous carbon dioxide therein and further inhibiting passage therethrough into the carbonated beverage of resultant carbonation reaction products including undesirable salts tending to adversely affect the flavor of said beverage, said permeable membrane having a pore size in the range of from 10 to 100 microns; and
   (d) a flavoring chamber, containing a quantity of flavoring for the beverage, superimposed on said pressure chamber over said top permeable membrane surface and in liquid and gaseous contact with the pressure chamber such that gaseous carbon dioxide bubbles passing upwardly through said permeable surface into and through said flavoring chamber assist in mixing the flavoring into the beverage.

2. An arrangement as claimed in claim 1, comprising a container for said beverage, said pressure chamber being an integral part of said container.

3. An arrangement as claimed in claim 2, said pressure chamber extending over substantially the entire bottom of said beverage container.

4. An arrangement as claimed in claim 1, said permeable membrane being formed of paper.

5. An arrangement as claimed in claim 1, said flavoring chamber and said pressure chamber comprising a unitary structure.

6. An arrangement as claimed in claim 5, said unitary structure being substantially tablet-shaped.

* * * * *